(12) United States Patent
Pandey et al.

(10) Patent No.: US 11,445,307 B2
(45) Date of Patent: Sep. 13, 2022

(54) PERSONAL COMMUNICATION DEVICE AS A HEARING AID WITH REAL-TIME INTERACTIVE USER INTERFACE

(71) Applicant: Indian Institute of Technology Bombay, Mumbai (IN)

(72) Inventors: Prem Chand Pandey, Mumbai (IN); Nitya Tiwari, Indore (IN); Saketh Sharma, Bangalore (IN)

(*) Notice: Subject to any disclaimer, the term of this patent is extended or adjusted under 35 U.S.C. 154(b) by 78 days.

(21) Appl. No.: 17/272,507

(22) PCT Filed: Aug. 30, 2019

(86) PCT No.: PCT/IN2019/050630
§ 371 (c)(1),
(2) Date: Mar. 1, 2021

(87) PCT Pub. No.: WO2020/044377
PCT Pub. Date: Mar. 5, 2020

(65) Prior Publication Data
US 2021/0329389 A1    Oct. 21, 2021

(30) Foreign Application Priority Data

Aug. 31, 2018  (IN) .............................. 201821032763

(51) Int. Cl.
*H04R 25/00* (2006.01)
*G06F 3/16* (2006.01)

(52) U.S. Cl.
CPC .......... *H04R 25/505* (2013.01); *G06F 3/162* (2013.01); *H04R 25/70* (2013.01); *H04R 2225/43* (2013.01)

(58) Field of Classification Search
CPC .. H04R 25/505; H04R 25/70; H04R 2225/43; G06F 3/162
See application file for complete search history.

(56) References Cited

U.S. PATENT DOCUMENTS

| | | | | |
|---|---|---|---|---|
| 9,185,487 | B2* | 11/2015 | Solbach | ................. H04R 3/005 |
| 2007/0055508 | A1* | 3/2007 | Zhao | .................. G10L 21/0216 |
| | | | | 704/226 |
| 2009/0185704 | A1* | 7/2009 | Hockley | ................ H04R 25/50 |
| | | | | 381/316 |
| 2012/0197636 | A1* | 8/2012 | Benesty | ............. G10L 21/0232 |
| | | | | 704/226 |

* cited by examiner

*Primary Examiner* — Tuan D Nguyen
(74) *Attorney, Agent, or Firm* — Hoffmann & Baron, LLP

(57) ABSTRACT

Hearing aids for persons with sensorineural hearing loss aim to compensate for degraded speech perception caused by frequency-dependent elevation of hearing thresholds, reduced dynamic range, abnormal loudness growth, and increased temporal and spectral masking. A digital hearing aid is implemented as a smartphone application as an alternative to ASIC-based hearing aids. The implementation provides user-configurable processing for background noise suppression and dynamic range compression. Both processing blocks are implemented for real-time processing using single FFT-based analysis-synthesis. A touch-controlled graphical user interface enables the user to set and fine-tune the processing parameters in an interactive and real-time mode.

4 Claims, 10 Drawing Sheets

PERSONAL COMMUNICATION DEVICE AS A HEARING AID WITH REAL-TIME INTERACTIVE USER INTERFACE

CROSS-REFERENCE TO RELATED APPLICATIONS

This application is the U.S. National Phase Application of International Application No. PCT/IN2019/050630, filed on Aug. 30, 2019, and asserts priority to Application No. IN 201821032763 filed Aug. 31, 2018, the disclosures of which are hereby incorporated by reference in their entirety.

TECHNICAL FIELD

The present disclosure relates to the field of signal processing for audio systems, and more specifically relates to a personal communication device as a hearing aid with a real-time interactive user interface for setting the processing parameters.

BACKGROUND

Sensorineural hearing loss is associated with loss of sensory hair cells in the cochlea or degeneration of the auditory nerve. It may be inherited genetically or may be caused by excessive noise exposure, aging, infection, or ototoxic drugs. It is characterized by frequency-dependent elevation of hearing thresholds, abnormal growth of loudness known as loudness recruitment, increased temporal and spectral masking, and widening of auditory filters leading to degraded speech perception. Several signal-processing techniques have been reported for improving the speech perception by patients suffering from sensorineural hearing loss.

Frequency-selective amplification and dynamic range compression are the primary processing techniques used in hearing aids (H. Dillon, Hearing Aids. New York: Thieme Medical, 2001; R. E. Sandlin, Textbook of Hearing Aid Amplification. San Diego, Cal.: Singular, 2000, pp. 210-220; D. Byrne, W. Tonnison, "Selecting the gain of hearing aids for persons with sensorineural hearing impairments," Scandinavian Audiology, vol. 5, pp. 51-59, 1976). Single-band dynamic range compression leads to reduced high-frequency audibility and multiband dynamic range compression may lead to perceptible distortion due to a transition of speech formants across the band boundaries. These problems can be addressed by using sliding-band dynamic range compression (P. C. Pandey and N. Tiwari, "Dynamic range compression with low distortion for use in hearing aids and audio systems," U.S. Pat. No. 9,672,834, 2017). The compression parameters can be tuned to fit the frequency-dependent thresholds and loudness recruitment of the patient.

Persons with sensorineural loss experience difficulty in understanding speech in a noisy environment. Processing for noise suppression in a hearing aid can improve speech audibility and quality. Spectral subtraction (S. F. Boll, "Suppression of acoustic noise in speech using spectral subtraction," IEEE Transactions on Acoustics, Speech and Signal Processing, vol. 27, no. 2, pp. 113-120, 1979), a single-channel speech enhancement technique using an estimate of the noise spectrum, is suitable for such applications as it has low algorithmic delay and computational complexity. Dynamic quantile tracking based noise estimation (P. C. Pandey and N. Tiwari, "Method and system for suppressing noise in speech signals in hearing aids and speech communication devices," U.S. Pat. No. 10,032,462B2, 2018) has been proposed for tracking stationary and non-stationary noise efficiently and it can be used for real-time noise suppression.

Hearing aids are designed using ASICs (application-specific integrated circuits) due to power and size constraints. Therefore, incorporation of a new compression technique in hearing aids and its field evaluation is prohibitively expensive. Use of smartphone-based application software (app) to customize and remotely configure settings on hearing aids provide greater flexibility to hearing aid users and developers. Many hearing aid manufacturers (GN ReSound, Phonak, Unitron, Siemens, etc) provide apps to control hearing aids using Android or iOS smartphone. This type of app helps the hearing aid user in personalizing the listening experience by adjustment of settings during use of the device and avoids repeated visits to an audiology clinic. The smartphone-based apps may also be used for development and testing of signal processing techniques for hearing aids. Hearing aid apps (e.g. 'Petralex', 'uSound', 'Q+', and 'BioAid' for Android/iOS, 'Mimi', 'EnhancedEars' for iOS, and "Hearing Aid with Replay" and "Ear Assist" for Android) provide users with moderate sensorineural hearing loss a low-cost alternative for hearing aids. In addition to providing frequency-selective gain and multiband dynamic range compression, they also offer the flexibility of creating and storing sound profiles specific to the user's hearing loss characteristics. However, they do not allow the users to set the processing parameters in an interactive and real-time mode.

Ambrose et al. (S. D. Ambrose, S. P. Gido, and R. B. Schulein, "Hearing device system and method," US Patent Application Publication No. US 2012/0057734 A1, 2012) have described an in-ear audio coupling device that can be used with an audio signal device like a smartphone to perform the function of a hearing aid. The speech input from the microphone of the smartphone is processed by the processor of the smartphone and the processed output is given to the in-ear audio coupling to serve as a hearing aid, and the software application on the smartphone allows setting of the hearing loss profile. Neumann et al. (J. Neumann, N. Wack, N. M. Rodriguez, N. S. Grange, and J. Kinsbergen, "Consumer electronics device adapted for hearing loss compensation," US Patent Application Publication No. US 2015/0195661A1, 2015) have described a device with two software modules for outputting a hearing loss compensated signal. The first module either routes the audio signal to the output of the device for normal hearing listeners or routes the audio signal to the input of the second software module. The second module processes the audio signal for hearing loss compensation. The processing parameters are input to the second module through a graphical user interface or a server connected through the internet.

Rader et al. (R. S. Rader, C. Menzel, B. W. Edwards, S. Puria, and B. B. Johansen, "Sound enhancement for mobile phones and others products producing personalized audio for users," U.S. Pat. No. 7,529,545B2, 2009) have described a personal communication device comprising a transmitter/receiver coupled to a communication medium for transmitting and receiving audio signals, control circuitry that controls the transmission and reception and processing of call and audio signals, a speaker, and a microphone. The control circuitry uses the preferred hearing profile of the user for processing the audio signals. The hearing profile may be obtained from a remote server or through the user interface of the device. The device also has a provision for hearing test. Lang et al. (H. Lang, S. Jaaskclaincn, S. Karjalainen, O. Aaltoncn, T. Kaikuranta, P. Vuori, "Mobile station with audio signal adaptation to hearing characteristics of the user," U.S. Pat. No. 6,813,490B1, 2004) have described a method and apparatus for increasing the intelligibility of speech signals in mobile communication, wherein the acoustic parameters of the speech are modified in the frequency domain, retaining the relative separation of the formants, to conform to the listener's hearing profile, which may be selected from a menu of predetermined profiles or may be entered through the user interface. The processing may be carried out on the communication network and the signal routed to the target mobile device.

Camp (W. O. Camp Jr., "Mobile terminals including compensation for hearing impairment and methods and computer program products for operating the same," U.S. Pat. No. 7,613,314B2, 2009) has described a device with a processor with a software for conducting a hearing test to determine hearing profile of the listener, process the audio signals in accordance with the hearing profile, and output the processed signals through an earphone. Mouline (A. Mouline, "Adaptation of audio data files based on personal hearing profiles," US Patent Application Publication No. US 2002/0068986A1, 2002) has described a method and system for processing the audio to compensate for frequency-dependent hearing loss, with a facility for storing the hearing loss profiles.

Foo and Hughes (E. W. Foo and G. F. Hughes, "Remotely updating a hearing and profile," U.S. Pat. No. 9,613,028B2, 2017) have described a method for updating a hearing loss profile stored in a hearing aid through a data link between the hearing aid and a hearing aid profile service. Westermann et al. (S. E. Westermann, S. V. Andersen, A. Westergaard, and N. E. B. Maretti, "System and method for managing a customizable configuration in a hearing aid," International Publication No. WO 2017/071757 A1, 2017) have described a system for managing hearing aid with the hearing loss profile set through the internet. Westergaard and Maretti (A. Westergaard and N. E. B. Maretti, "System and method for personalizing a hearing aid," International Publication No. WO 2017/028876, 2017) have described a method of personalizing a hearing aid by setting the processing parameters in accordance with the audiogram input from a server and further fine-tuning by an audiologist.

Thus, several devices have been reported for realizing hearing aids to compensate for frequency-dependent hearing profile of the listener. However, these devices do not provide real-time suppression of the nonstationary background noise, which may severely degrade the speech perception by listeners with sensorineural hearing impairment. Further, the available devices do not permit setting of the processing parameters by the listener in an interactive mode to compensate for the individual's abnormal frequency-dependent loudness growth curve. There is, therefore, a need to mitigate the disadvantages associated with the existing devices, by devising a hearing aid with processing for suppressing the background noise and a real-time interactive user interface for setting the processing parameters.

SUMMARY

In an implementation of the present disclosure, a personal communication device, such as a smartphone with an operating system and at least one application for processing the stream of audio signals, may be configured to perform as a hearing aid. The application embedded into the personal communication device provides signal processing for noise suppression to improve speech quality and intelligibility for hearing-impaired listeners and dynamic range compression to compensate for the individual user's frequency-dependent hearing loss and reduced dynamic range.

In another implementation, a method is disclosed for efficient implementation of the processing by sharing the computation-intensive operations of the analysis-synthesis for the two types of processing, data buffering for reducing the input-output latency in real-time processing, and interactive and real-time user interface for setting the processing parameters.

BRIEF DESCRIPTION OF THE DRAWINGS

The detailed description of the invention is described with reference to the accompanying figures.

DETAILED DESCRIPTION OF THE INVENTION

The present disclosure discloses a method enabling use of a personal communication device, such as a smartphone with an operating system and at least one application embedded in the device for processing the stream of audio signals, as a hearing aid. The smartphone as hearing aid enables fine-tuning of the frequency-dependent parameters through an interactive mode using a touch-controlled graphical user interface (GUI). The smartphone along with the GUI enables signal processing for suppression of background noise and dynamic range compression to compensate for the frequency-dependent increase in hearing thresholds and decrease in the dynamic range associated with sensorineural hearing loss. The dynamic range compression may be carried out using sliding-band compression to overcome the problems associated with conventionally used single-band compression and multiband compression.

Suppression of background noise is necessary to enhance the speech signal for use in hearing aids. Single-channel speech enhancement is useful in such applications, particularly when a second microphone cannot be used due to space or cost constraints.

Figure 1:
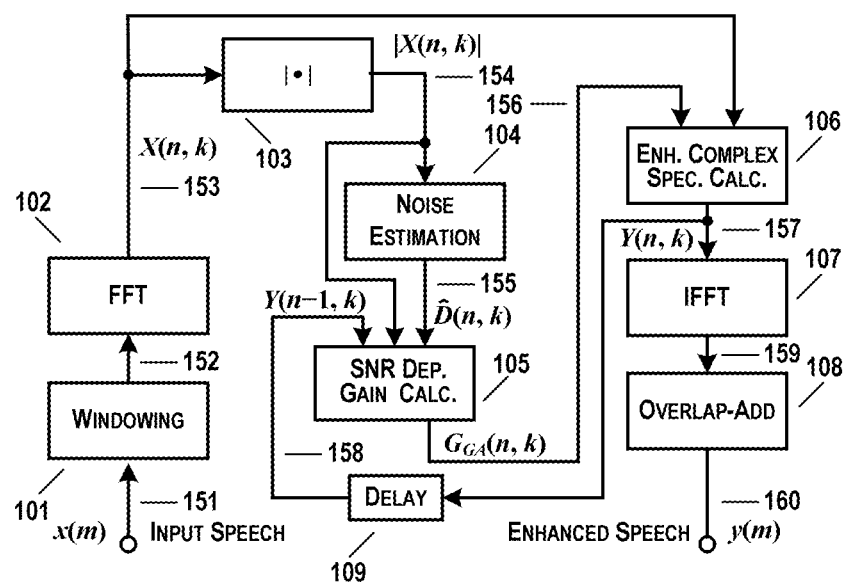
FIG. 1 is a schematic illustration of speech enhancement by spectral subtraction, in accordance with an aspect of the present disclosure.

Single-channel speech enhancement using spectral subtraction based on the geometric approach may be used for suppression of background noise, as it results in smaller residual noise. FIG. 1 shows a block diagram of the spectral subtraction technique for suppressing additive noise. The processing may comprise the processing blocks of windowing (101), FFT calculation (102), magnitude spectrum calculation (103), noise estimation (104), SNR-dependent gain calculation (105), enhanced complex spectrum calculation (106), IFFT calculation (107), re-synthesis using overlap-add (108), and delay (109). In this embodiment of the processing, the input speech x(m) (151) is windowed by the windowing 101 to output analysis frames to the FFT calculation 152, which outputs the signal complex spectrum X(n,k) (153), with n as the frame number and k as the frequency index. The magnitude spectrum calculation 103 uses the complex spectrum 153 as the input and outputs the signal magnitude spectrum |X(n,k)| (154), which is input to the noise estimation 104 to obtain the noise magnitude spectrum $\hat{D}$(n,k) (155). The SNR-dependent gain calculation 105 is used to obtain an SNR-dependent gain function $G_{GA}$(n,k) (156). The speech enhancement is carried out by multiplying the SNR-dependent gain function 156 with the signal complex spectrum 153 to obtain the enhanced complex spectrum Y(n,k) (157). The SNR-dependent gain calculation (105) receives the enhanced complex spectrum 157 through the delay 109, noise magnitude spectrum 155, and the signal magnitude spectrum 154, and outputs the SNR-dependent gain 156. The res-synthesis using overlap-add 108 receives the output 159 of the IFFT calculation 107 and outputs the enhanced speech y(m) (160).

The dynamic quantile tracking based noise estimation may be used along with spectral subtraction for noise suppression. For each frequency index of the spectrum, the most frequently occurring value, obtained as the peak of the histogram, can be reported to be representative of the noise value. The noise estimation method can dynamically estimate histogram using the dynamic quantile tracking with low memory and computation requirements. The peak of the histogram may be used as the adaptive quantile for estimating the noise at each frequency index. The histogram can be estimated by dynamically tracking multiple quantile values for a set of evenly spaced probabilities. The desired quantile corresponding to the peak of the histogram may be obtained by finding quantile for which the difference between neighboring quantile values is minimum.

In a preferred computationaly efficient embodiment, the estimate of $p_i(k)$-quantile, $\hat{q}_i(n,k)$, is obtained by applying an increment or a decrement on its previous estimate as $$\hat{q}_i(n,k) = \hat{q}_i(n-1,k) + d_i(n,k) \tag{1}$$

The change $d_i(n,k)$ is given as $$d_i(n, k) = \begin{cases} \Delta_i^+(k), & |X(n, k)| \geq \hat{q}_i(n-1, k) \\ -\Delta_i^-(k), & \text{otherwise} \end{cases} \tag{2}$$

where $\Delta_i^+(k)$ and $\Delta_i^-(k)$ are selected to be appropriate fractions of the range R(n,k) as $$\Delta_i^+(k) = \lambda R(n,k)p_i(k) \tag{3}$$

$$\Delta_i^-(k) = \lambda R(n,k)(1-p_i(k)) \tag{4}$$

The range is estimated using dynamic peak and valley detectors for updating the peak P(n,k) and the valley V(n,k) using the following equations:

$$P(n, k) = \begin{cases} \tau_p P(n-1, k) + \\ (1-\tau_p)|X(n, k)|, & |X(n, k)| \geq P(n-1, k) \\ \sigma_p P(n-1, k) + \\ (1-\sigma_p)V(n-1, k), & \text{otherwise} \end{cases} \tag{5}$$

$$V(n, k) = \begin{cases} \tau_v V(n-1, k) + \\ (1-\tau_v)|X(n, k)|, & |X(n, k)| \leq V(n-1, k) \\ \sigma_v V(n-1, k) + \\ (1-\sigma_v)P(n-1, k), & \text{otherwise} \end{cases} \tag{6}$$

$$R(n, k) = P(n, k) - V(n, k) \tag{7}$$

The dynamic quantile tracking to estimate quantile $\hat{q}_i(n,k)$ as given by Equations 1, 2, and 7 can be written as the following:

$$\hat{q}_i(n, k) = \begin{cases} \hat{q}_i(n-1, k) + \\ \lambda p_i(k)R(n, k), & |X(n, k)| \geq \hat{q}_i(n-1, k) \\ \hat{q}_i(n-1, k) - \\ \lambda(1 - p_i(k))R(n, k), & \text{otherwise} \end{cases} \tag{8}$$

Figure 2:
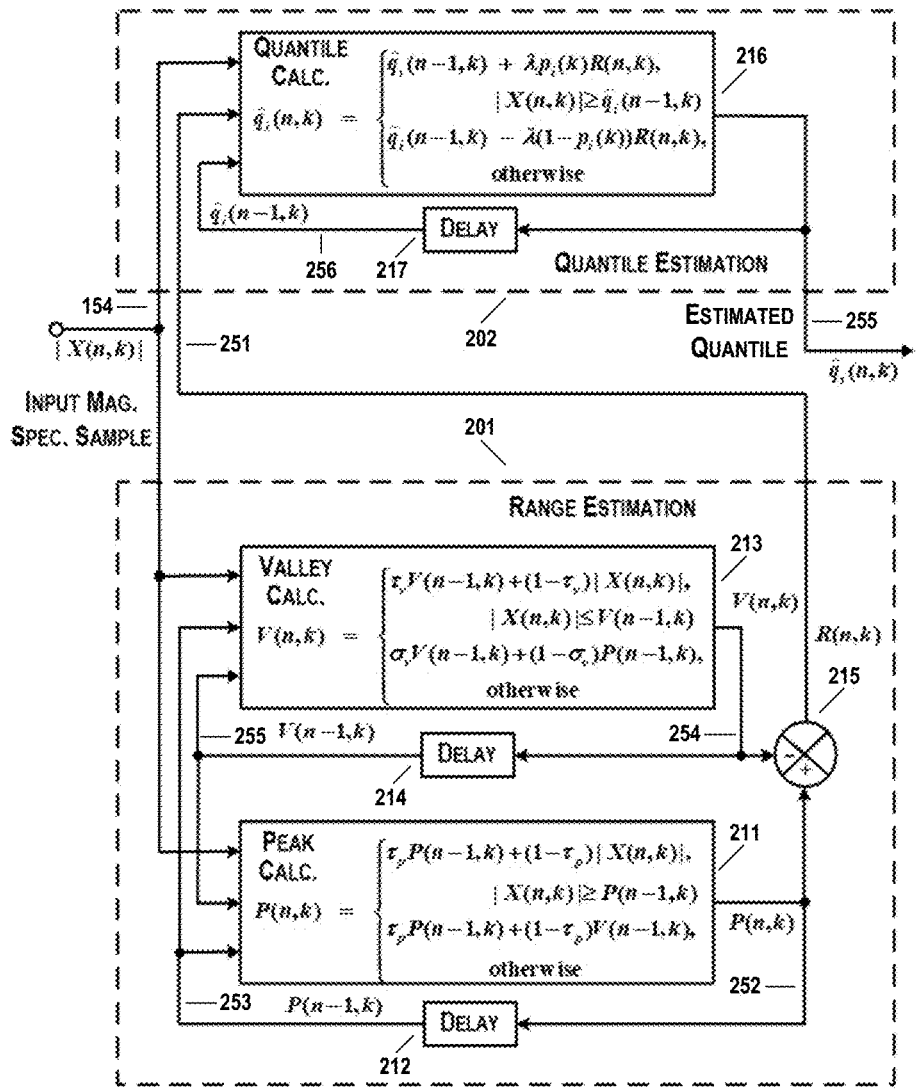
FIG. 2 is a schematic illustration of the dynamic quantile tracking technique used for tracking quantiles for estimation of the noise spectrum, in accordance with an aspect of the present disclosure.

A block diagram of the computation steps as given in Equations 1-8 is shown in FIG. 2, with two main processing blocks (marked by dotted outlines) of range estimation 201 and quantile estimation 202. The range estimation block (201) receives the input magnitude spectral sample $|X_n(k)|$ (154) as the input and outputs the estimated range of the noise spectral sample $R_n(k)$ (251). The quantile estimation block 202 receives $|X_n(k)|$ (154) and $R_n(k)$ (251) as the inputs and outputs the quantile estimate $\hat{q}_i(n,k)$ (255). In the range estimation block 201, the peak calculator 211 calculates the peak $P_n(k)$ (252) using Equation 5 and the output 253 of the delay 212. The valley calculator 213 calculates the valley $V_n(k)$ 254 using Equation 6 and the output 255 of the delay 214. The range $R_n(k)$ (251) is calculated by the difference block 215 using Equation 7. In the quantile estimation block 202, the quantile calculator 216 calculates $\hat{q}_i(n,k)$ (255) using Equation 8 and the output 256 of the delay 217. The quantile $\hat{q}_i(n,k)$ (255) is used to calculate the noise magnitude spectrum $\hat{D}$(n,k) (155), as $$\hat{D}(n, k) = \mathrm{argmin}_{\hat{q}_i(n,k)}[\hat{q}_i(n, k) - \hat{q}_{i-1}(n, k)]; i = 2, 3, \ldots, J \tag{9}$$

where J is the number of quantiles tracked.

Figure 3:
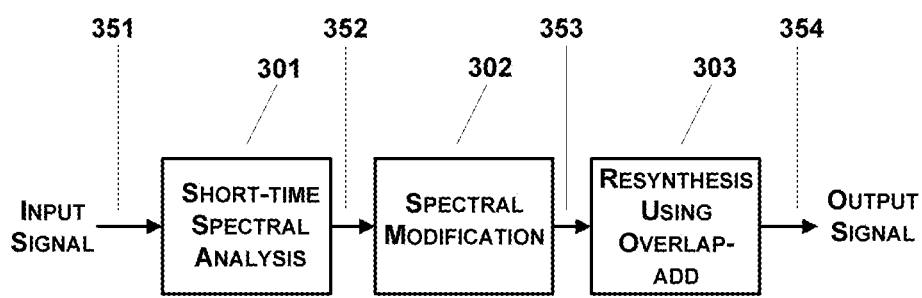
FIG. 3 is a schematic illustration of sliding-band compression system, in accordance with an aspect of the present disclosure.

The processing for sliding-band compression may be carried out as shown in FIG. 3, comprising the cascaded processing blocks of short-time spectral analysis 301, spectral modification 302, and re-synthesis using overlap-add 303. To compensate for increased hearing thresholds and reduced dynamic range, a frequency-dependent gain function can be calculated in accordance with the desired levels for 'soft', 'comfortable', and 'loud' sounds (referred to as SL, CL, LL, respectively). For each frequency index k, the spectral modification can be carried out using a piecewise linear relationship between the input power and the output power on dB scale. The relationship is specified by the values of $P_{OdBSL}(k)$, $P_{OdCL}(k)$, and $P_{OdBLL}(k)$ which are the output signal levels corresponding to soft, comfortable, and loud sounds, respectively, for the hearing aid user and by the values of $P_{IdBSl}(k)$ and $P_{IdBLL}(k)$ which are the input signal levels corresponding to soft and loud sounds, respectively, for a normal-hearing listener. The relationship can be defined in three regions with the compression ratio as 'CR=1', 'CR>1', and 'CR=∞' in the first, second, and third region respectively. With $G_{IdB}(k) = P_{OdBSL}(k) - P_{IdBSL}(k)$, the target gain for the frequency index k in the nth frame in the three regions is given as $$G_{TdB}(n, k) = \begin{cases} G_{LdB}(k), & P_{IdB}(n,k) < P_{OdBCL}(k) - G_{LdB}(k) \\ G_{LdB}(k) - \{P_{IdB}(n,k) - \frac{P_{OdBCL}(k)\}\{CR(k)-1\}}{CR(k)}, & P_{OdBCL}(k) - G_{LdB}(k) \leq P_{IdB}(n,k) \leq P_{IdBLL}(k) \\ P_{OdBLL}(k) - P_{IdB}(n,k), & P_{IdB}(n,k) > P_{IdBLL}(k) \end{cases} \quad (10)$$

Figure 4:
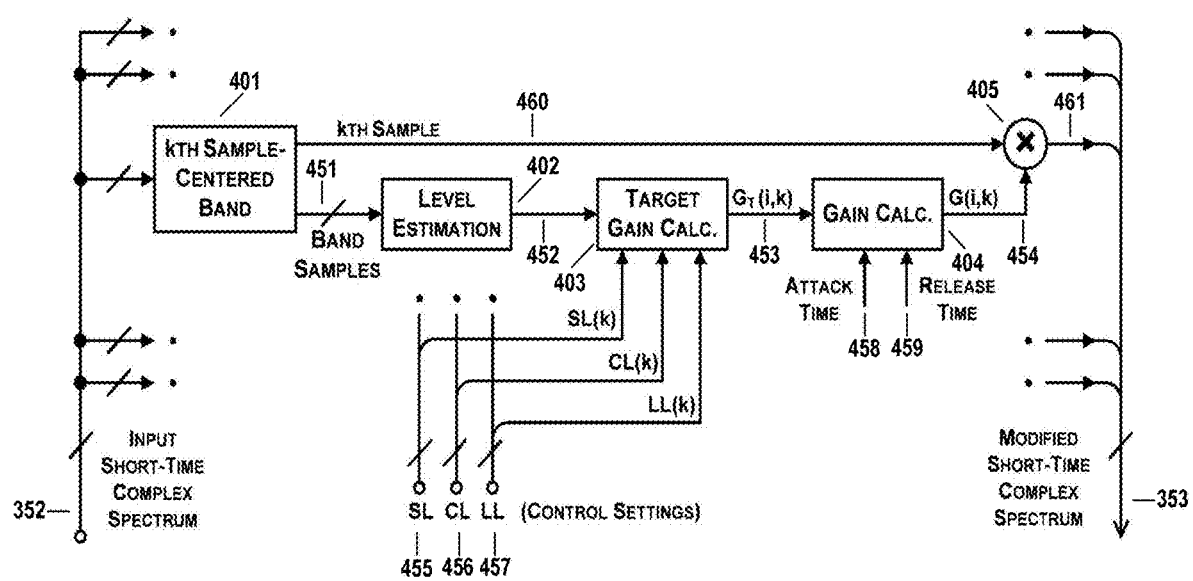
FIG. 4 is a schematic illustration of spectral modification for sliding-band compression system, in accordance with an aspect of the present disclosure.

A block diagram of the processing for spectral modification for sliding-band compression is shown in FIG. 4, with the input short-time complex spectrum 352 as the input and the modified short-time complex spectrum 353 as the output. For the frequency index k in the nth frame, the input level $P_{IdB}(n,k)$ is calculated, from the input short-time complex spectrum 352, as the sum of squared magnitudes of the spectral samples in the band centered at k and with the bandwidth corresponding to the auditory critical bandwidth $$BW(k) = 25 + 75(1 + 1.4(f(k))^2)^{0.69} \quad (11)$$

where f(k) is the frequency, in kHz, corresponding to the kth spectral sample. For spectral modification, the target gain is converted to a linear scale. The gain 454 applied for the frequency index k in the nth frame is obtained using the desired attack and release rates by updating the gain from the previous value towards the target 453, as given in Equation 10. It is given as $$G(i, k) = \begin{cases} \max(G(n-1,k)/\gamma_a, G_T(n,k)) \cdot G_T(n,k) < G(n-1,k) \\ G(n-1, k) \\ \min(G(n-1, k)\gamma_r, G_T(n,k)) \geq G(n-1, k) \end{cases} \quad (12)$$

The number of steps during the attack and release phases may be controlled using gain ratios $\gamma_a = (G_{max}/G_{min})^{1/s_a}$ and $\gamma_r = (G_{max}/G_{min})^{1/s_r}$, respectively. Here $G_{max}$ and $G_{min}$ are the maximum and minimum possible values of the target gain. The number of steps $s_a$ during attack and the number of steps $s_r$ during release are selected to set the attack time as $T_a = S_a S_\alpha S/f_s$ and the release time as $T_r = S_r S/f_s$, where $f_s$=sampling frequency and S=number of samples for frame-shift. A fast attack avoids the output level from exceeding the uncomfortable level during transients, and a slow release avoids amplification of breathing.

Figure 5:
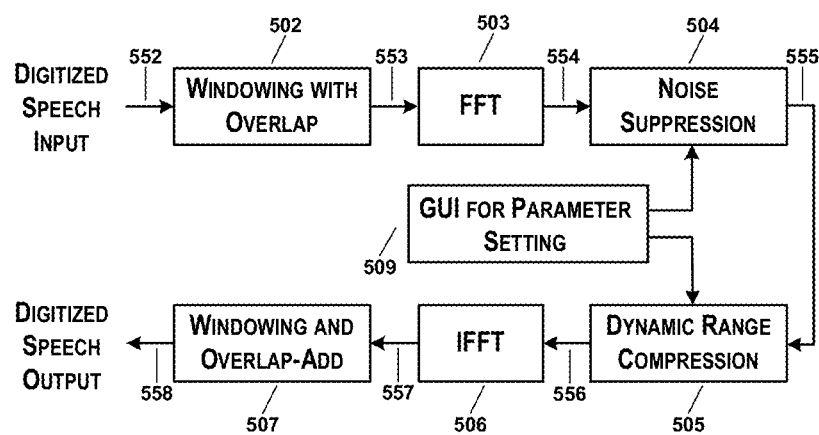
FIG. 5 is a schematic illustration of efficient implementation of the signal processing for noise suppression and dynamic range compression by sharing the operations of the FFT-based analysis-synthesis, in accordance with an embodiment of the present disclosure.

An efficient implementation of the processing by sharing the computation-intensive operations of the FFT-based analysis-synthesis for noise suppression based on computationally efficient dynamic quantile tracking and sliding-band dynamic range compression may be carried out as shown in FIG. 5, with the digitized speech input 552 as the input signal and the digitized speech output 558 as the output signal. The implementation may comprise the processing blocks for windowing with overlap 502, FFT calculation 503, noise suppression 504, dynamic range compression 505, IFFT calculation 506, windowing with overlap 507, and GUI for parameter setting 509.

Figure 6:
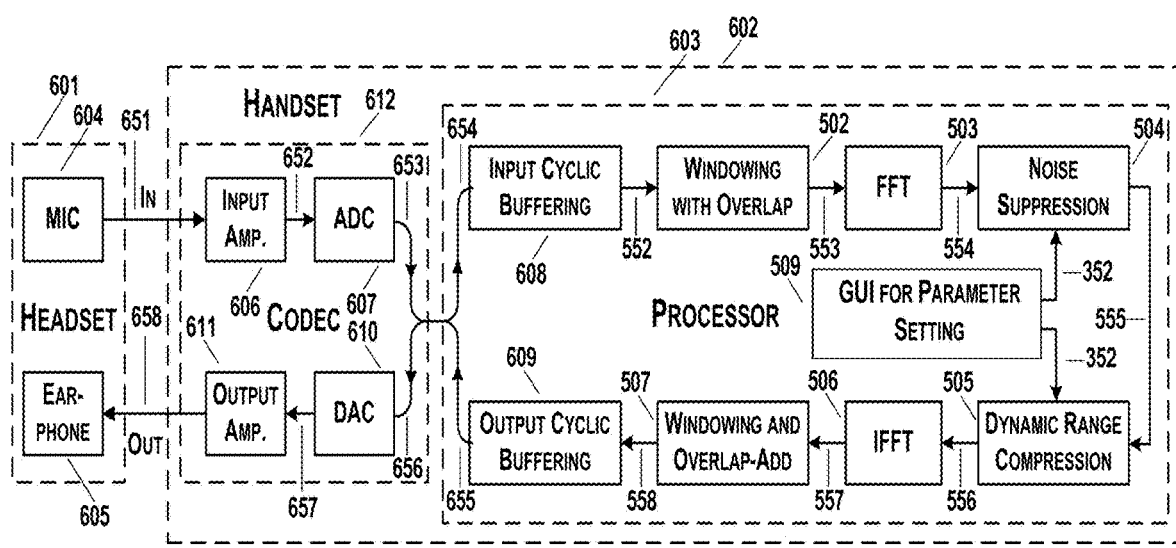
FIG. 6 is a schematic illustration of the personal communication device with the hearing aid application for noise suppression and dynamic range compensation, in accordance with an embodiment of the present disclosure.

FIG. 6 shows a block diagram of an exemplary implementation of the hearing aid app. The setup comprises a personal communication device handset 602, such as a smartphone handset and a headset 601. The headset 601 comprises a microphone and a pair of earphones with associated wires and switching. The handset 602 further comprises a codec 612, a processor 603, and a display with touch screen (not shown in the figure) for the user interface. The input signal acquired from the microphone 604 of the headset 601 is amplified and converted to digital samples by the analog-to-digital converter (ADC) 607 of the codec 612. These samples may be buffered, processed, and buffered by the processor. The resulting samples can be output through the digital-to-analog converter (DAC) 610 of the codec 612 and amplified. The resulting signal is output through the earphones 605 of the headset. In an exemplary embodiment of the processing, the analysis-synthesis may be carried out using 20-ms frames with 75% frame overlap and 1024-point FFT, with the processing parameters selected as sampling frequency=24 kHz, L=480, S=120, and N=1024.

Figure 7:
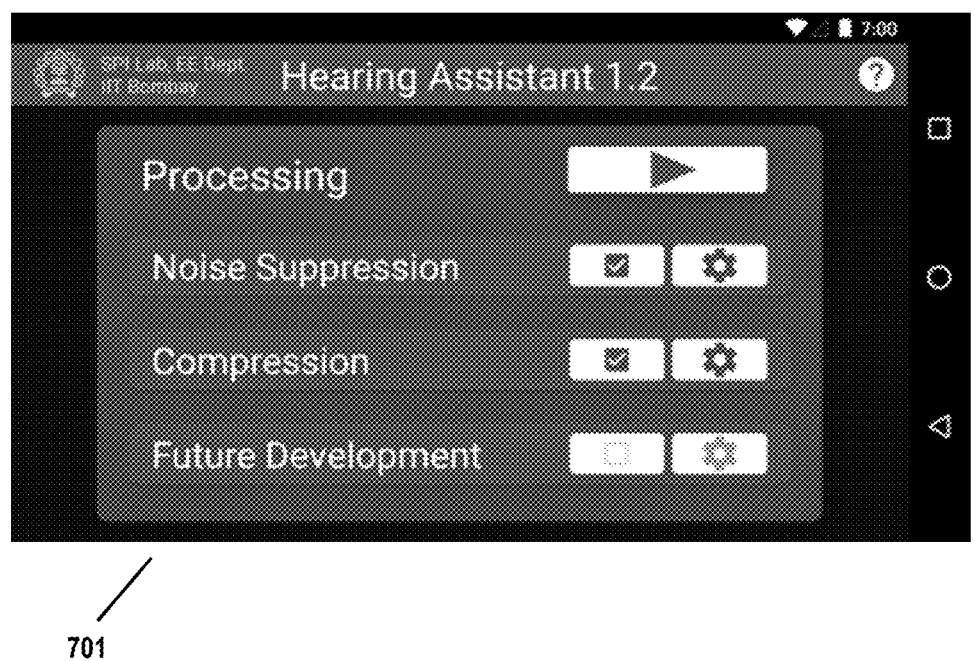
FIG. 7 is a screenshot of the home screen of the app, in accordance with an aspect of the present disclosure.
Figure 8:
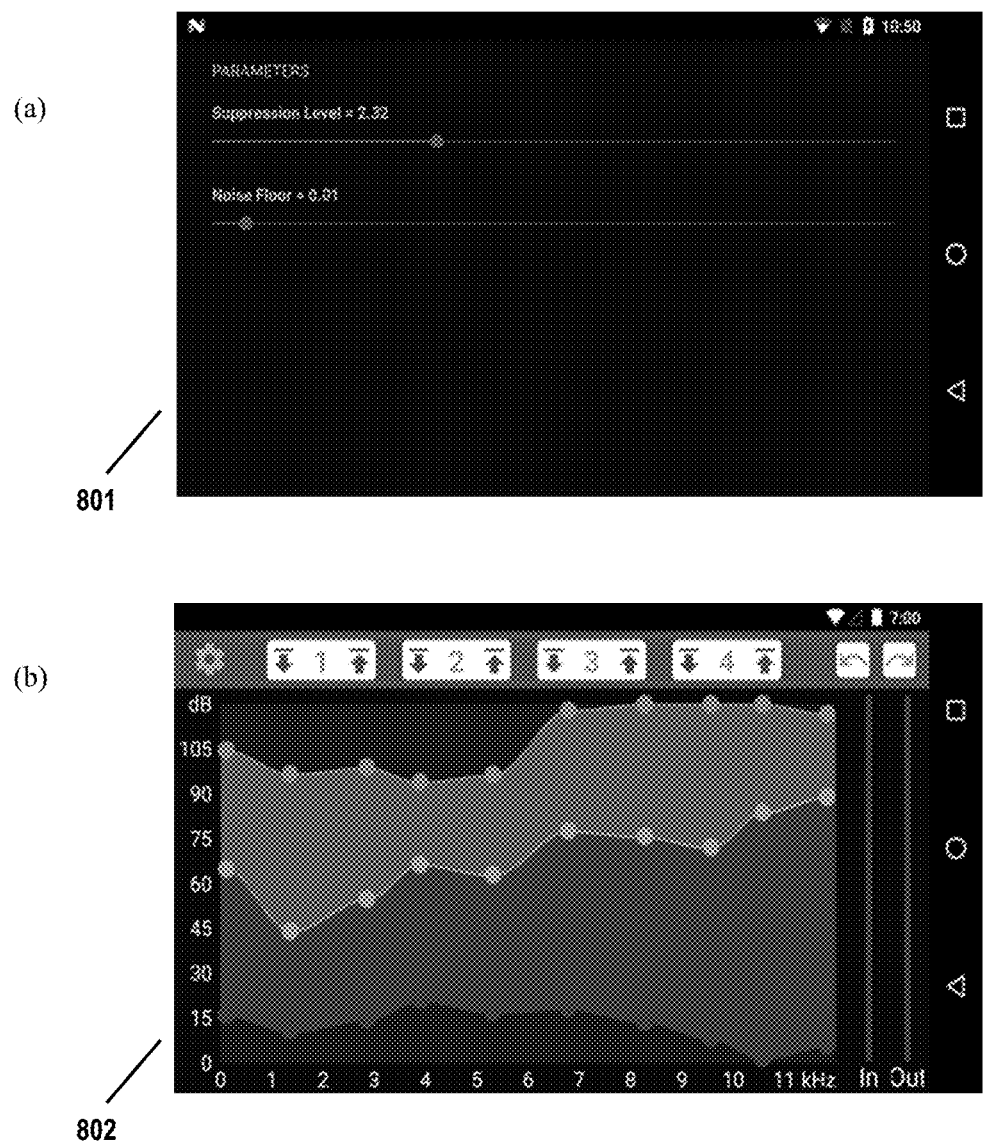
FIG. 8 is a screenshot of the settings screen. Panel (a) of the figure shows screenshot of the settings screen for noise suppression. Panel (b) of the figure shows screenshot of the settings screen for dynamic range compression.

A screenshot of the home screen of the app, in accordance with an aspect of the present disclosure is illustrated in FIG. 7. The play/stop button is for control of the output. All processing modules have individual 'on/off' and 'settings' buttons, with the on/off button for toggling the processing and the settings button for setting the processing parameters graphically. FIG. 8a shows an exemplary screenshot of the 'settings' screen for noise suppression and dynamic range compression modules. Settings for noise suppression module provides a user interface with touch control of points, called 'thumbs', for selecting the values of over-subtraction factor α as function of frequency. The values of α can be set as 1-5 for up to 10 frequencies and the values for all the intermediate frequencies are obtained by smooth curve fitting. The screenshot of the 'settings' screen for dynamic range compression showing graphical controls for the SL, CL, and LL values, is shown in FIG. 8b. The user interface consists of three touch-controlled curves to set the values of SL, CL, and LL across frequencies. Control points called as thumbs are provided to adjust the curves. Each curve may consist of a number of thumbs. Provision may be made to store and retrieve multiple parameter settings. The user interface may also have 'undo' and 'redo' buttons to access recent thumb movements. Such an implementation enables the user to adjust the processing parameters in an interactive and real-time mode, to save the processing parameters as one of the profiles, or to select the most appropriate profile from the saved ones.

Figure 9:
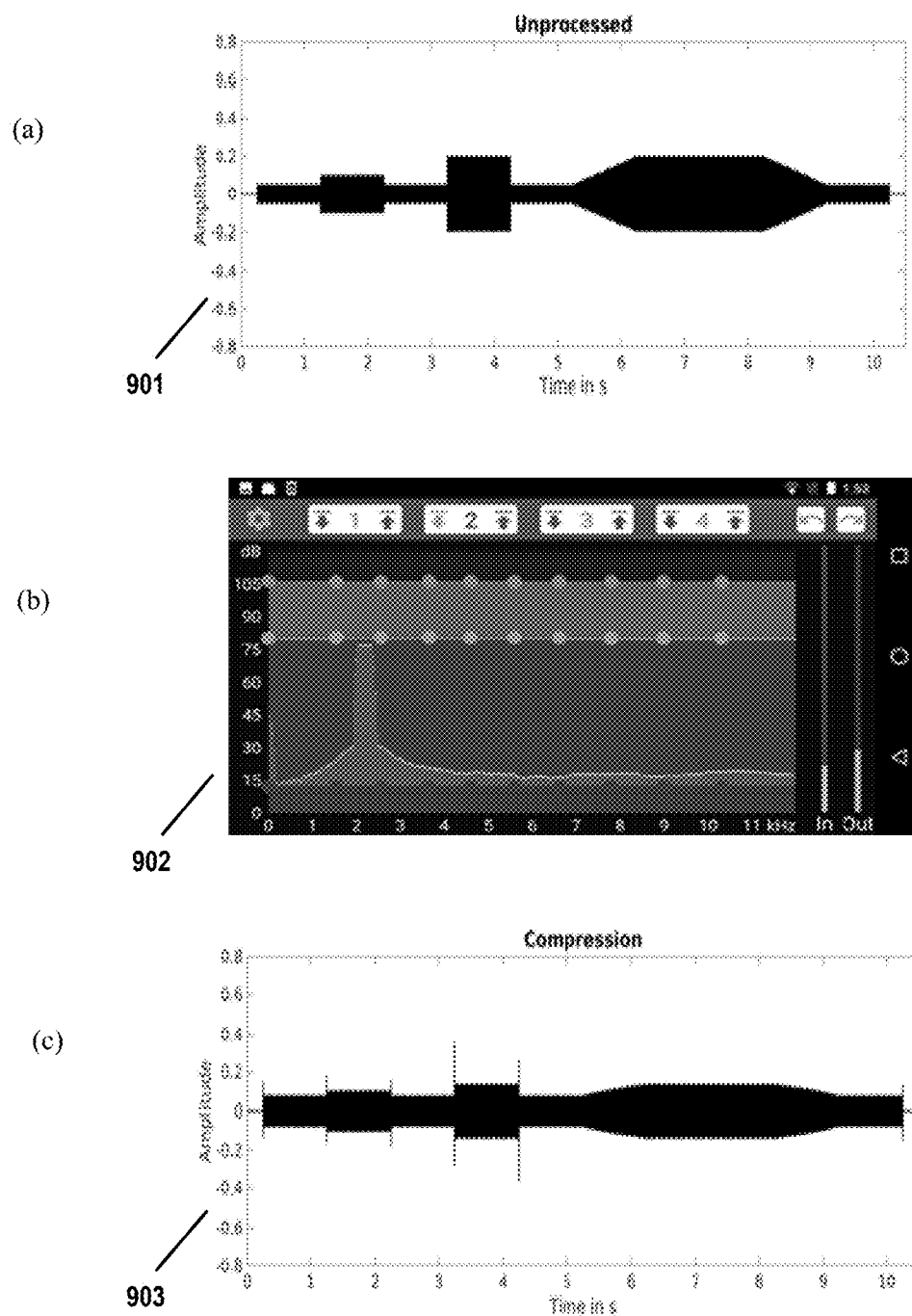
FIG. 9 shows an example of processing for dynamic range compression. Panel (a) of the figure shows input signal of amplitude modulated tone of 1 kHz. Panel (b) of the figure shows GUI parameters set for constant gain of 12 dB and compression ratio of 2. Panel (c) of the figure shows the processed output.
Figure 10:
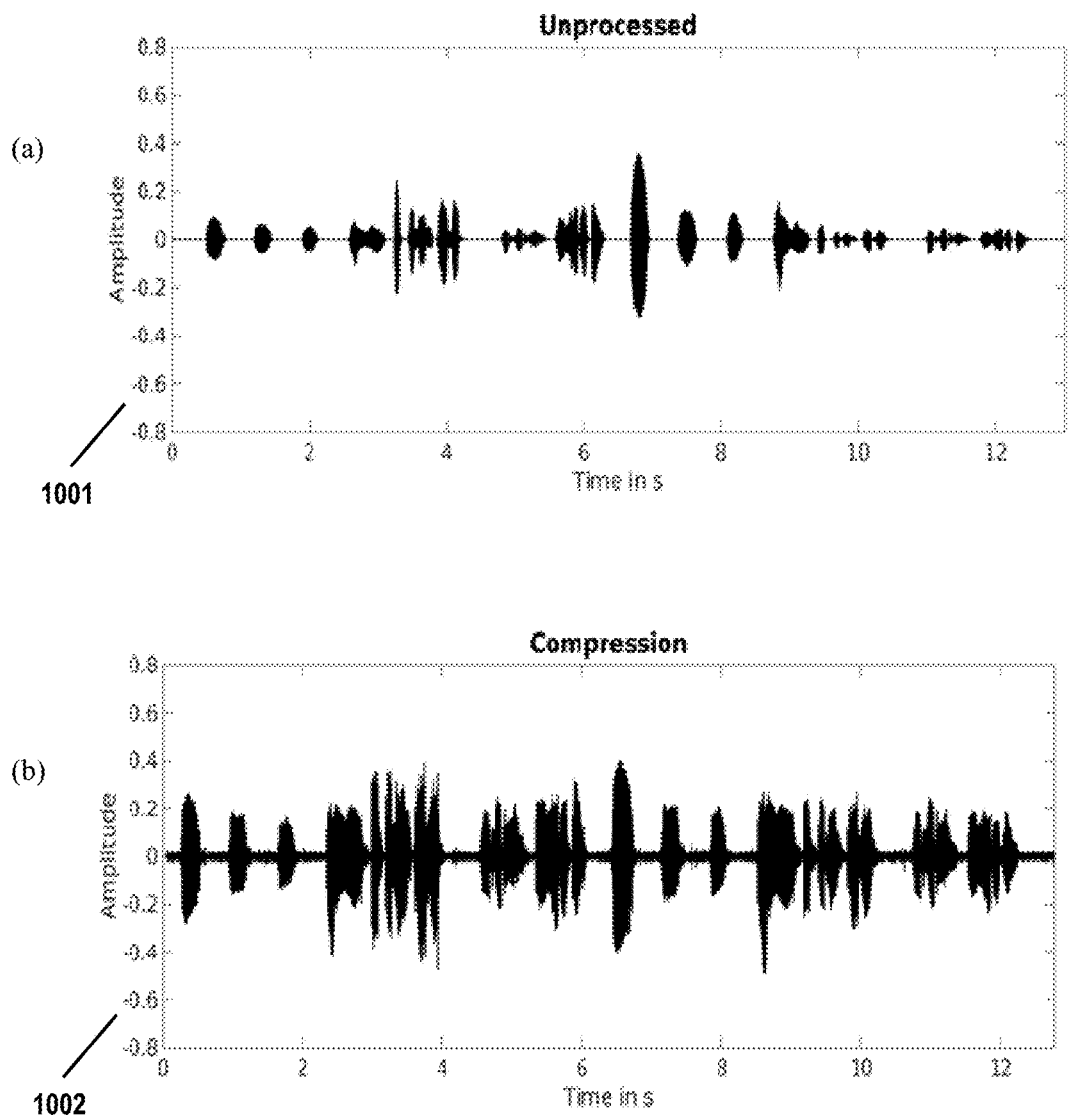
FIG. 10 shows an example of processing for dynamic range compression. Panel (a) of the figure shows a speech signal with large amplitude variation. Panel (b) of the figure shows processed speech with parameters as shown in 9(b).

An example of the dynamic range compression with an amplitude modulated input is shown in FIG. 9. Input is an amplitude-modulated tone of 1 kHz and processing parameters are set as shown in FIG. 9(b) with a compression ratio of 2. The processing gives higher gains at lower values of the input level. Spikes in the amplitude envelope of the output signal in response to step changes in the amplitude envelope of the input signal, as seen in the figure, are typical of the dynamic range compression with a finite frameshift and can be eliminated by using one-sample frameshift but with a significantly increased computation load. Another example of the processing is shown in FIG. 10, for an amplitude modulated concatenation of speech signals. The input consists of three isolated vowels, a Hindi sentence, and an English sentence, (-/a/-/i/-/u/-"aaiye aap ka naam kya hai?"—"where were you a year ago?"). For different speech materials, music, and environmental sounds with large variation in the sound level as the input, the output exhibited the desired amplification and compression without introducing perceptible distortions.

In an embodiment of the invention to enable the use of a smartphone as a hearing aid, integration of the signal processing for dynamic quantile tracking based noise suppression and sliding-band dynamic range compression has been implemented using 'LG Nexus 5X' running 'Android 7.1'. The processing parameters can be set by the user in an interactive and real-time mode using a graphical touch interface. The audio latency of the implementation was 45 ms, which is much less than the detectability threshold of 125 ms for audio-visual delay, and hence may be considered as acceptable for a hearing aid during face-to-face conversation.

The foregoing description of the invention is to be considered as exemplary and not restrictive, as the processing blocks described in the disclosure may be partitioned and/or combined in many ways and the app can be implemented using other smartphones and other types of graphical user interfaces.

We claim:

1. A method for real-time signal processing to process a digitized input speech signal, by a personal communication device comprising an input amplifier, an analog-to-digital converter, a digital-to-analog converter, an output amplifier, a digital processor, and a graphical user interface, using Fast Fourier Transform (FFT-based) analysis-synthesis for a quantile-based noise suppression to reduce background noise and a sliding-band dynamic range compression to compensate for frequency-dependent hearing loss and reduced dynamic range, in order to improve speech quality and intelligibility for hearing-impaired listeners, wherein the processing for the quantile-based noise suppression comprises the steps of:

(i) performing a dynamic quantile tracking based noise estimation by estimating a histogram for each frequency index of spectrum of the digitized input speech signal, wherein the histogram is estimated by dynamically tracking a plurality of quantile values for frequency indices of the spectrum, obtaining a quantile value corresponding to peak of the histogram by finding a quantile value having a minimum difference between neighboring quantile values, and estimating noise at each frequency index by using peak of the histogram, wherein the quantile value is calculated by applying an increment or a decrement on its previous value, with the increment and decrement selected to be a fraction of a dynamically estimated range of the frequency index such that the quantile value approaches a sample quantile over a number of successive analysis frames; and (ii) performing spectral subtraction of the noise at each frequency index from the spectrum to obtain enhanced complex spectrum;

and the processing for the sliding-band dynamic range compression is carried out by calculating a frequency-dependent gain function in accordance with a level in a band centered at each frequency index and a piecewise linear relation between an input power and an output power on a dB scale for each spectral sample and the gain function is used for modification of the spectrum, and wherein the graphical user interface provides the plurality of control settings to facilitate setting and fine tuning of frequency-dependent parameters for the signal processing in an interactive and real-time mode, wherein the graphical user interface provides a plurality of control settings to the user for setting parameters of the dynamic quantile tracking based noise suppression and the sliding-band dynamic range compression process.

2. The real-time signal processing method as claimed in claim 1, wherein the FFT-based analysis-synthesis is carried out with 20-ms frames with 75% frame overlap.

3. A digital hearing aid system, comprising:

a headset with a microphone acquiring an analog input speech signal and an earphone for outputting a processed analog speech output signal;

a personal communication device in communication with the headset, wherein the personal communication device comprises:

an input amplifier amplifying the analog input speech signal acquired by the microphone of the headset;

an analog-to-digital converter to convert an amplified analog input speech signal from the input amplifier to a digitized input speech signal;

a digital-to-analog converter to convert a processed digital speech output signal to an analog output signal;

an output amplifier amplifying the analog output signal and outputting the processed analog speech output signal to the earphone of the headset;

a digital processor interfaced to the analog-to-digital converter and the digital-to-analog converter; and a graphical user interface in communication with the digital processor;

wherein the digital processor of the personal communication device is configured to process the digitized input speech signal using Fast Fourier Transform (FFT-based) analysis-synthesis for a quantile-based noise suppression to reduce background noise and a sliding-band dynamic range compression to compensate for frequency-dependent hearing loss and reduced dynamic range, in order to improve speech quality and intelligibility for hearing-impaired listeners, wherein the processing for the quantile-based noise suppression comprises the steps of:

(i) performing a dynamic quantile tracking based noise estimation by estimating a histogram for each frequency index of spectrum of the digitized input speech signal, wherein the histogram is estimated by dynamically tracking a plurality of quantile values for frequency indices of the spectrum, obtaining a quantile value corresponding to peak of the histogram by finding a quantile value having a minimum difference between neighboring quantile values, and estimating noise at each frequency index by using peak of the histogram wherein the quantile value is calculated by applying an increment or a decrement on its previous value, with the increment and decrement selected to be a fraction of a dynamically estimated range of frequency index such that the quantile value approaches a sample quantile over a number of successive analysis frames; and (ii) performing spectral subtraction of the noise at each frequency index from the spectrum to obtain enhanced complex spectrum;

and the processing for the sliding-band dynamic range compression is carried out by calculating a frequency-dependent gain function in accordance with a level in a band centered at each frequency index and a piece-wise linear relation between an input power and an output power on a dB scale for each spectral sample and the gain function is used for modification of the spectrum, and wherein the graphical user interface provides a plurality of control settings to facilitate setting and fine tuning of frequency-dependent parameters for the signal processing in an interactive and real-time mode, wherein the graphical user interface provides a plurality of control settings to the user for setting parameters of the dynamic quantile tracking based noise suppression and the sliding-band dynamic range compression process.

4. The digital hearing aid system as claimed in claim 3, wherein the graphical user interface is a touch screen interface.

* * * * *